US010086396B2

(12) United States Patent
Sedaei

(10) Patent No.: US 10,086,396 B2
(45) Date of Patent: Oct. 2, 2018

(54) ELECTRO-ANTI DEPOSIT DEVICE FOR REMOVING MINERAL DEPOSITS IN DRIP IRRIGATION SYSTEMS

(71) Applicant: Nazila Sedaei, Tabriz (IR)

(72) Inventor: Nazila Sedaei, Tabriz (IR)

(*) Notice: Subject to any disclaimer, the term of this patent is extended or adjusted under 35 U.S.C. 154(b) by 172 days.

(21) Appl. No.: 15/083,213

(22) Filed: Mar. 28, 2016

(65) Prior Publication Data

US 2017/0275768 A1 Sep. 28, 2017

(51) Int. Cl.

| C25F 1/00 | (2006.01) |
|---|---|
| B05B 15/55 | (2018.01) |
| A01G 25/02 | (2006.01) |
| B08B 9/023 | (2006.01) |
| B08B 7/00 | (2006.01) |
| B05B 15/52 | (2018.01) |
| B08B 3/10 | (2006.01) |
| B08B 17/00 | (2006.01) |
| C25F 1/04 | (2006.01) |
| C25F 7/00 | (2006.01) |
| B08B 9/027 | (2006.01) |
| C02F 1/461 | (2006.01) |

(52) U.S. Cl.
CPC .............. *B05B 15/55* (2018.02); *A01G 25/02* (2013.01); *B05B 15/52* (2018.02); *B08B 3/10* (2013.01); *B08B 7/0071* (2013.01); *B08B 9/023* (2013.01); *B08B 17/00* (2013.01); *C25F 1/04* (2013.01); *C25F 7/00* (2013.01); *B08B 9/027* (2013.01); *C02F 1/46176* (2013.01); *C02F 2001/46123* (2013.01); *C02F 2303/22* (2013.01)

(58) Field of Classification Search
CPC .... C25F 4/00–4/04; C25F 13/00–13/13; C25F 15/00–15/005; C25F 1/00–1/12; A01G 25/02; B05B 15/50–15/58
See application file for complete search history.

(56) References Cited

U.S. PATENT DOCUMENTS

| 2,894,111 A * | 7/1959 | McNutt | B23K 9/0286 |
| | | | 219/125.11 |
| 6,516,992 B1 * | 2/2003 | Colligan | B23K 20/1235 |
| | | | 228/112.1 |
| 7,183,517 B2 * | 2/2007 | Albrecht | B23K 9/1056 |
| | | | 219/130.4 |
| 2004/0099713 A1 * | 5/2004 | Laing | B23K 37/0531 |
| | | | 228/212 |
| 2014/0061168 A1 * | 3/2014 | Nakakura | B23K 11/063 |
| | | | 219/82 |

(Continued)

*Primary Examiner* — Edna Wong
*Assistant Examiner* — Alexander W Keeling
(74) *Attorney, Agent, or Firm* — NovoTechIP International PLLC

(57) ABSTRACT

An electro-anti deposit device is coupled to an irrigation pipe for removing mineral deposit from drippers of the pipe. The electro-anti deposit device includes an engine configured to move the electro-anti deposit device along the pipe. The electro-anti deposit device also includes a mineral deposit removal module. The mineral deposit removal module includes a water container, a battery, and two electrodes. The water container may be configured to create an ionic environment at a dripper. The dripper may be covered with the mineral deposit. The battery may be configured to generate electric current. The two electrodes may be connected to two poles of the battery with a space separating tips of the two electrodes.

13 Claims, 5 Drawing Sheets

(56) References Cited

U.S. PATENT DOCUMENTS

2014/0260840 A1* 9/2014 Mori ................... B23B 3/26
                                              82/113
2015/0174706 A1* 6/2015 McClure ........... B23K 37/0533
                                              269/45

* cited by examiner

ELECTRO-ANTI DEPOSIT DEVICE FOR REMOVING MINERAL DEPOSITS IN DRIP IRRIGATION SYSTEMS

CROSS REFERNCE TO RELATED APPLICATION

This application claims the benefit of priority to an Iran patent application having serial number 139450140003000073 filed on Mar. 28, 2015, which subsequently issued as Iran patent number 86446 on Aug. 12, 2015, the entire content of which is incorporated herein by reference.

TECHNICAL FIELD

The present application relates generally to drip irrigation systems, more particularly, to an electro-anti deposit device for removing mineral deposits that block irrigation drippers, by using electricity.

BACKGROUND

Drip irrigation systems, save water and fertilizer by allowing water to drip slowly to the roots of many different plants, either onto the soil surface or directly onto the root zone, through a network of valves, pipes, tubing, and emitters. It is done through narrow tubes (e.g., drippers) that deliver water directly to the base of the plant. In such drip irrigation systems, pressure produced by a pump or due to difference of elevation can cause water to flow in the network of pipes and drip onto the designated areas via drippers placed on the pipes. In order to prevent substances such as sand and soil from entering the water, and clog the drippers, the water may be filtered prior to entering the irrigation system. In addition, fertilizers and plant food and nutrients may be added to the water.

However, issues may arise while using drip irrigation systems. In various geographical areas, for example in areas having hard water resources, salt, minerals or other particles contained in water may settle in the pipes and in the drippers over time and block the dripper openings. The mineral deposit can disable the irrigation system and prevent the irrigation process, for example, by causing uneven irrigation. Removal of the mineral deposits from the irrigation systems can be a costly process, which includes replacing the blocked drippers or pipes or cleaning the drippers and pipes, which may require disassembling and reassembling whole or parts of the system.

In some instances, refining or filtering water prior to feeding the water into the irrigation system may reduce the particles contained in the water. In other cases, washing and cleaning the drippers may solve the problem by removing the mineral deposit. In yet other instances, control of water pressure has been suggested such that the pressure causes the mineral deposit to be removed from drippers. However, the solutions previously suggested require the drip irrigation network to be restructured and redesigned. As a result, the cost of maintenance can be high and unaffordable for farmers.

Therefore, a need exists for an economically beneficial solution for removing mineral deposit from drip irrigation drippers without a need for restructuring the irrigation network.

SUMMARY

An electro-anti deposit device coupled to an irrigation pipe for removing mineral deposit from a set of irrigation drippers of the irrigation pipe is provided. The electro-anti deposit device includes an engine configured to move the electro-anti deposit device along the irrigation pipe; and a mineral deposit removal module. The mineral deposit removal module includes a water container for creating an ionic environment at an irrigation dripper from among the set of irrigation drippers, wherein the irrigation dripper is covered with the mineral deposit; a first battery for generation electric current; and two electrodes connected to two poles of the first battery, wherein a space separates tips of the two electrodes. The electro-anti deposit device can be moving configured to moisten the mineral deposit at the irrigation dripper using the water from the water container, enable contact between the two electrodes through the moistened mineral deposit, and generate an electric current using the first battery and pass the generated electric current through the mineral deposit from one of the two electrodes to other of the two electrodes, such that the electric current dissolves the mineral deposit.

The electro-anti deposit device includes a remote control module configured to control the engine for moving the electro-anti deposit device along the irrigation pipe. The engine can be operated by a second battery. The first battery or the second battery can be a rechargeable battery.

The electro-anti deposit device includes a set of rollers, wherein the movement of the electro-anti deposit device includes sliding on the irrigation pipe using the set of rollers. At least one of the set of rollers can be coupled to a belt and the belt can be coupled to a shaft rotated by the engine, and the rotation of the shaft rotates the belt, which in turn rotates the at least one roller, and the rotation of the at least one roller causes the electro-anti deposit device to move along the irrigation pipe.

The electro-anti deposit device includes two vertical plates, wherein each vertical plate is placed on one side of the irrigation pipe such that together the vertical plates squeeze the irrigation pipe and hold the electro-anti deposit device tight thereto.

The electro-anti deposit device includes a horizontal plate coupled to one of the two vertical plates, wherein the horizontal plate is configured to mount the engine via a fastening element. The fastening element includes nuts and bolts. The engine can be configured to move the electro-anti deposit device until the water container is aligned with the irrigation dripper.

The electro-anti deposit device includes a controller configured to stop the movement of the electro-anti deposit device once the water container is aligned with the irrigation dripper. The controller can be configured to automatically stop the movement of the electro-anti deposit device once the water container is aligned with the irrigation dripper. The controller can be configured to stop the movement of the electro-anti deposit device once the water container is aligned with the irrigation dripper based on a manual input from a user.

BRIEF DESCRIPTION OF THE DRAWINGS

Features of the subject technology are set forth in the appended claims. However, for purpose of explanation, several implementations of the subject technology are set forth in the following figures.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

In drip irrigation systems, water enters irrigation pipes with a pressure provided by one or more pumps or due to a difference in elevation. The water entering the irrigation pipes drops on crops, shrubs or under trees from emitters or drippers installed on the pipe. In some cases, in order to prevent particles from entering the irrigation pipe and blocking the drippers, water may be filtered prior to entering the irrigation pipe. Fertilizers and plant food can be added to the water. Prior to irrigation, various tests may be performed to determine the amount of water needed at a location and by the plantation at that location. Based on the test results, number of drippers are adjusted such that each tree, bush or shrub receives adequate amount of water.

The drip irrigation method can be used in various locations. In large farms, the area of the farm may be divided into smaller pieces and each piece provided with an irrigation system. However, issues may arise while using drip irrigation. In some cases, the minerals and particles in water, especially in areas with heavy water, may cause creation of mineral deposits inside the drippers that may cause blockage of the drippers. Blockage of drippers overtime may damage the irrigation system and prevent plantations from receiving enough water supply.

Various solutions may be considered to solve the dripper blockage issue. Some of the solutions may include water filtration, washing the irrigation pipes drippers, using chemicals to dissolve and clean mineral deposits. Each of these solutions have disadvantages such as high costs and limited availability. In some cases, due to unavailability of the solutions, farmers may stop using drip irrigation systems altogether.

Some other suggested solutions include increasing water pressure, designing special types of anti-clogging drippers, etc. However, the suggested solutions would require special preparations of the land, or replacing part of or the whole irrigation system with improved suggested components, which may incur extra costs and as a result not practical for farmers.

The disclosed electro-anti deposit device can be installed on existing drip irrigation systems without a need for changes in the irrigation system. The electro-anti deposit device is a low cost device that can facilitate removal of mineral deposits from drippers of a drip irrigation system.

Figure 1:
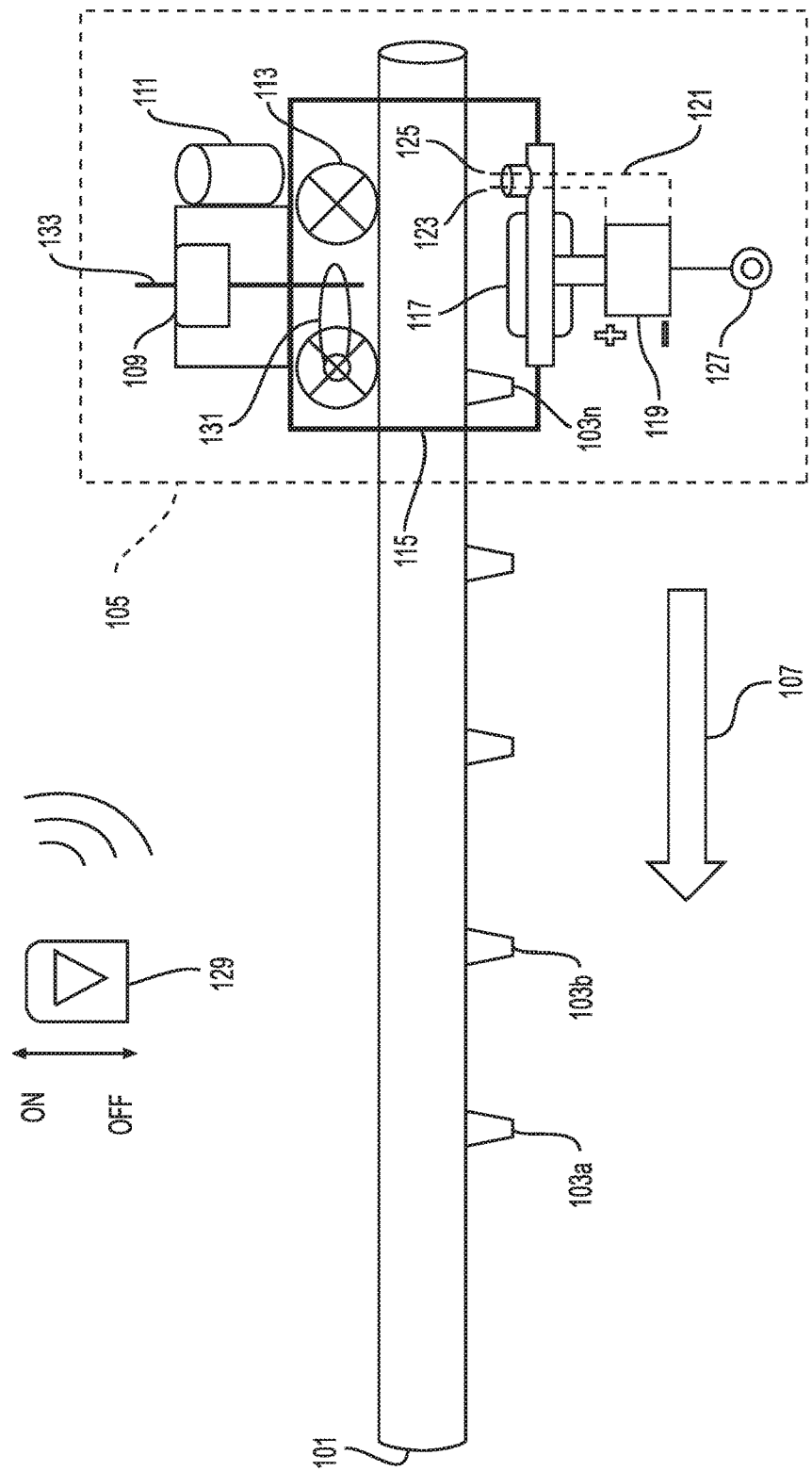
FIG. 1 illustrates a schematic diagram of an electro-anti deposit device, according to an implementation of the instant application.

FIG. 1 illustrates an electro-anti deposit device, according to an implementation. The electro-anti deposit device, as disclosed, facilitates removal of mineral deposit on drippers of a drip irrigation system using an electric current. An electric current is a flow of electric charge. In electric circuits this charge is often carried by moving electrons in a wire. It can also be carried by ions in an electrolyte, or by both ions and electrons such as in a plasma.

For a steady flow of charge through a surface, the current I (in amperes) can be calculated with the equation (1):

$$I = \frac{\partial q}{\partial t} \quad (1)$$

where q is the electric charge transferred through the surface over a time t. If q and t are measured in coulombs and seconds respectively, I is in amperes.

In equation (1), the electric current I can vary by time. More generally, electric current can be represented as the rate at which charge flows through a given surface as:

$$i = \frac{dq}{dt} \quad (2)$$

As shown in FIG. 1, an electro-anti deposit device 105 includes an engine 109 that operates with a battery 111. The engine 109 produces power for the electro-anti deposit device 105 to slide on an irrigation pipe 101. Arrow 107 illustrates the direction of sliding of electro-anti deposit device 105 on pipe 101. To this end, the electro-anti deposit device 105 may also include a set of rollers 113. The rollers 113 can have a spool shape to fit the shape of the irrigation pipe 101.

Figure 2:
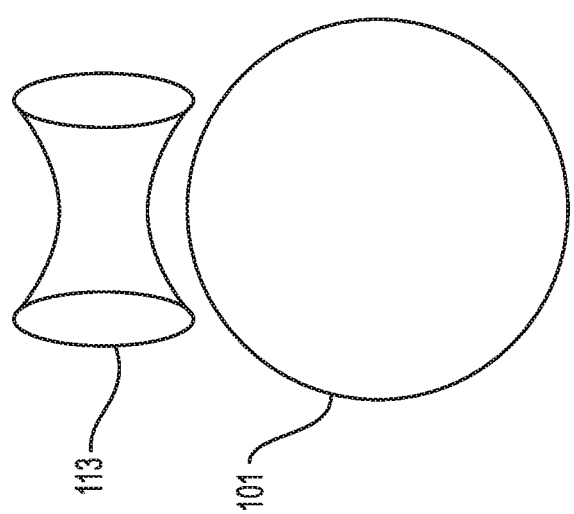
FIG. 2 illustrates a cross section of a roller of an electro-anti deposit device attached to an irrigation pipe, according to an implementation of the instant application.

FIG. 2 illustrates a cross section of a roller 113 of an electro-anti deposit 105 device (not shown) attached to an irrigation pipe 101. The rollers 113 enable the electro-anti deposit device 105 to slide on irrigation pipe 101. The electro-anti deposit device 105 may also include one or more plates 115 made from non-corrosive material such as, for example, polyethylene, to protect the electro-anti deposit device 105 against corrosion.

The electro-anti deposit device 105 may also include a mineral deposit removal module. The mineral deposit removal module may include a water container 117 two electrodes 123 and 125 and a battery 119. The water container 117 may be in the form of a sponge, a spraying device, etc. The irrigation pipe 101 includes multiple emitters or drippers 103a-103n via which the water flowing inside the irrigation pipe 101 drops on the earth below the pipe 101.

The power generated by battery 119 runs through electrodes 123 and 125 via wires 121. The electrodes 123 and 125 can be installed on a base such that a distance of a few millimeters separates the tips of the electrodes (e.g., a cathode and an anode). When the electro-anti deposit device 105 slides forward on the irrigation pipe 101 in the direction of arrow 107, the water container (e.g. sponge 117) comes to contact with the tip of each dripper 103a-103n. The water from the container 117 dampens the tip of the dripper 103a-103n and creates an ionic environment. The moisture from water can also loosen the mineral deposit at the dripper tip. After the dripper tip 103a-103n being moistened by the water from the container 117, while the electro-anti deposit device 105 is still sliding in direction 107, the electrodes 123 and 125 come in contact with the dripper tip 103a-103n. Coming to contact with the moist mineral deposit at the tip of the dripper, the circuit between battery 119 and electrodes 123 and 125 can be established and the electric current produced by battery 119 flows through wires 121 and electrodes 123 and 125. The electric current passing through the mineral deposit 201 raises the temperature of the mineral deposit and dissolves the mineral deposit. The wires 121 can be from stainless type wires which are resistant against corrosion due to water and minerals contained in water. The batteries 119 and 111 can be selected from various battery types such as primary cell batteries, rechargeable batteries, solar batteries, etc.

Figure 3:
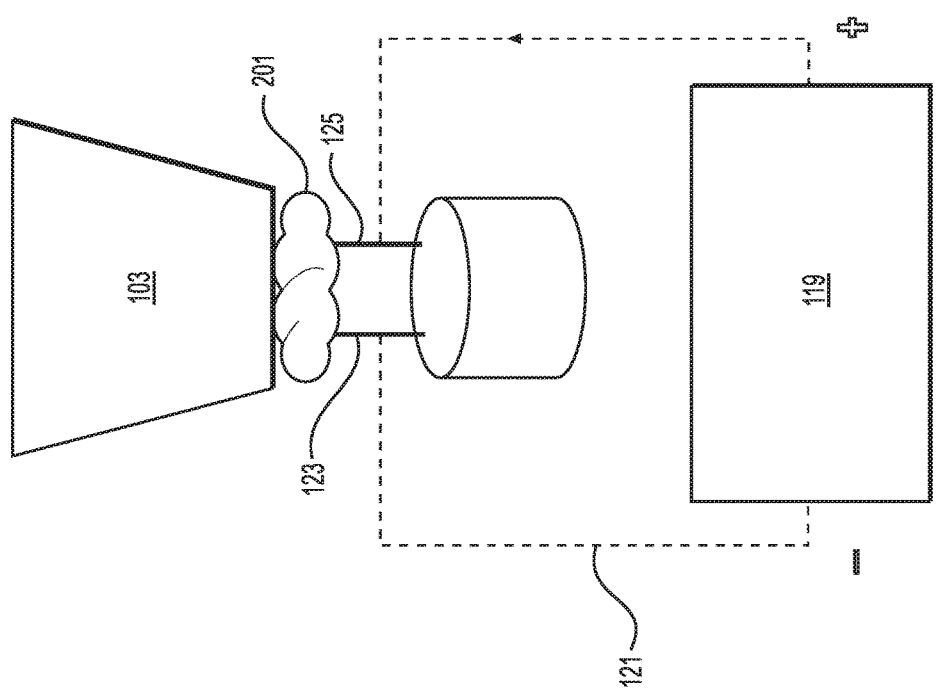
FIG. 3 illustrates an electrical circuit facilitating removal of the mineral deposit on a dripper, according to an implementation of the instant application.

FIG. 3 illustrates a close-up view of the electrical circuit facilitating removal of the mineral deposit on a dripper. As shown in FIG. 3, the electric current produced by battery 119 flows through wires 121 into electrodes 123 and 125. The water container 117 and the electrodes 123 and 125 are positioned on the electro-anti deposit device 105 such that the water container comes in contact with the mineral deposit 201 and moistens the mineral deposit 201 prior to the electrodes 123 and 125 come to contact with the mineral deposit 201.

The moist mineral deposit 201 at the tip of dripper 103 can conduct the electric current from electrode 125 to electrode 123. In some cases, the electric current can generate a spark between electrodes 123 and 125 such that the current passes through the mineral deposit 201. The electric current passing through mineral deposit 201 can raise the temperature of the mineral deposit and facilitate decomposing of the mineral deposits. The raised temperature can also dissolve the mineral deposit. The decomposed mineral deposits can then be loosen due to temperature and exit the dripper by water dripping from the drippers.

Figure 4A:
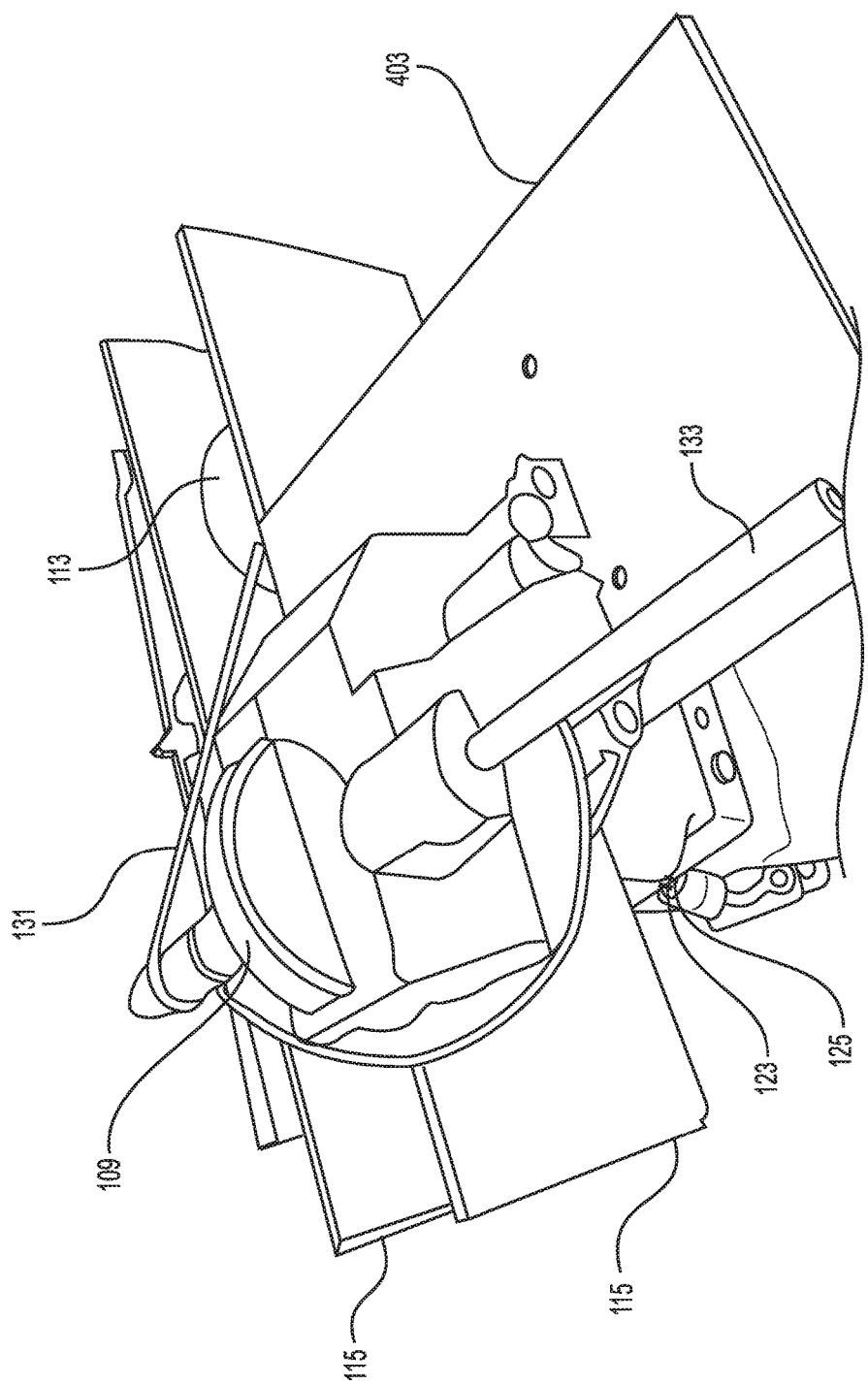
FIGS. 4A-4B illustrate different views of an electro-anti deposit device, according to an implementation of the instant application.
Figure 4B:
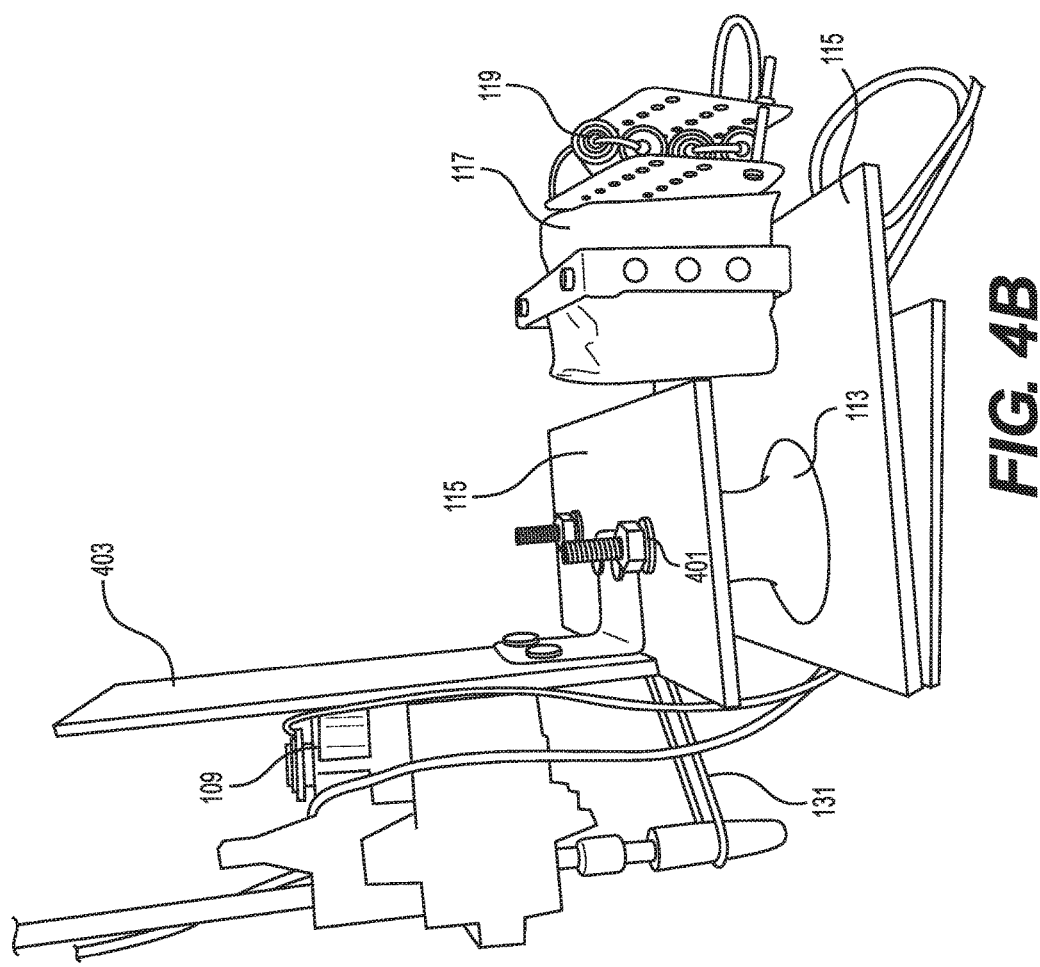

FIGS. 4A-4B illustrate different views of an electro-anti deposit device, according to an implementation of the instant application. As shown in FIGS. 4A and 4B, in one implementation, the electron-anti deposit device 105 includes two vertical plates 115. Each vertical plate 115 may be placed on one side of the irrigation pipe 101 (not shown) such that together they squeeze the irrigation pipe 101 and hold the device 105 tight thereto.

The rollers 113 may also be placed between the two vertical plates 115 on the top of the irrigation pipe 101. Each roller 113 may be coupled on a first side thereof to the first vertical plate 115 and on a second side thereof to the second vertical plate 115. The fastening element used may include a bolt and a screw 401, for example. The bolt may pass through an aperture within the first vertical plate 115, an aperture within a center of the roller 113 and then an aperture within the second vertical plate 115 and may then engage with a screw to maintain its position.

The electro-anti deposit device 105 may also include a horizontal plate 403. The horizontal plate 403 may be coupled to one of the vertical plates 115. The horizontal plate may be used for mounting the engine 109. The engine 109 may be mounted to the horizontal plate by a fastening element. The fastening element may include nuts and bolts, in one example.

Referring back to FIG. 1, the electro-anti deposit device 105 may also include a remote control 129 for remotely controlling the engine 109. A person working with the electro-anti deposit device 105 can use the remote controller 129 to turn ON/OFF and Start/Stop the engine 109 to slide in direction 107 or in a direction opposite 107 and adjust the position of the electro-anti deposit device 105 on the irrigation pipe 101. When ON and in the start mode, the engine 109 rotates a shaft 133, which is coupled to a belt 131. The belt 131 is in turn coupled to the one of the rollers 113 as shown. The rotation of the shaft 133 rotates the belt 131, which in turn rotates the roller 113. As a result, the electro-anti deposit device 105 moves on the pipe 101.

The engine 109 can be configured to move the electro-anti deposit device 105 until the water container 117 is aligned with an irrigation dripper 103a-103n.

The electro-anti deposit device 105 may include a controller 129 configured to stop the movement of the electro-anti deposit device 105 once the water container 117 is aligned with the irrigation dripper 103a-103n. The controller 129 can be configured to automatically stop the movement of the electro-anti deposit device 105 once the water container 117 is aligned with the irrigation dripper 103a-103n. The controller 129 can be configured to stop the movement of the electro-anti deposit device 105 once the water container 117 is aligned with the irrigation dripper 103a-103n based on a manual input from a user.

For example, the remote control 129 can be used by a user to stop the electro-anti deposit device 105 at each dripper 103a-103n such that the electric current from batteries 119 pass through the electrodes 123 and 125 and the mineral deposit 201. In some instances, a timer may be attached to the engine 109 such that the movement and stopping intervals of the electro-anti deposit device 105 is automatically controlled via the timer. For example, a 2 seconds stop time at each dripper 103a-103n may provide enough time for the electric current from battery 119 to pass through the mineral deposit 201.

The electro-anti deposit device 105 may also include one or more ball bearings 127 or other similar components to provide a balance of the electro anti-deposit device 105 on the irrigation pipe 101.

The separation of various components in the examples described above should not be understood as requiring such separation in all examples, and it should be understood that the described components and systems can generally be integrated together in a single packaged into multiple systems.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various implementations for the purpose of streamlining the disclosure. This method of disclosure is not to be interpreted as reflecting an intention that the claimed implementations require more features than are expressly recited in each claim. Rather, as the following claims reflect, inventive subject matter lies in less than all features of a single disclosed implementation. Thus the following claims are hereby incorporated into the Detailed Description, with each claim standing on its own as a separately claimed subject matter.

What is claimed is:

1. An irrigation dripper deposit removing device comprising:
   an irrigation dripper pipe comprising a plurality of drippers with mineral deposits on the surface of said drippers; and
   an electro-anti deposit device coupled to the irrigation dripper pipe for removing the mineral deposits, the electro-anti deposit device comprising:
   an engine configured to move the electro-anti deposit device along the irrigation dripper pipe; and
   a mineral deposit removal module including:
      a water container containing water for creating an ionic environment at an irrigation dripper from among the plurality of drippers, wherein the irrigation dripper is covered with the mineral deposit;
      a first battery for generating electric current; and
      two electrodes connected to two poles of the first battery, wherein a space separates tips of the two electrodes, wherein the electro-anti deposit device is configured to:
   moisten the mineral deposit at the irrigation dripper using the water from the water container,
   enable contact between the two electrodes through the moistened mineral deposit, and
   generate an electric current using the first battery and pass the generated electric current through the mineral deposit from one of the two electrodes to other of the two electrodes, such that the electric current dissolves the mineral deposit.

2. The irrigation dripper deposit removing device of claim 1, wherein the electro-anti deposit device further includes:
   a remote control module configured to control the engine for moving the electro-anti deposit device along the irrigation pipe.

3. The irrigation dripper deposit removing device of claim 1, wherein the engine is operated by a second battery.

4. The irrigation dripper deposit removing device of claim 3, wherein the first battery or the second battery is a rechargeable battery.

5. The irrigation dripper deposit removing device of claim 1, wherein the electro-anti deposit device further includes a plurality of rollers, wherein the movement of the electro-anti deposit device includes sliding on the irrigation dripper pipe using the plurality of rollers.

6. The irrigation dripper deposit removing device of claim 5, wherein:
   at least one of the plurality of rollers is coupled to a belt and the belt is coupled to a shaft rotated by the engine, and
   the rotation of the shaft rotates the belt, which in turn rotates the at least one roller, and the rotation of the at least one roller causes the electro-anti deposit device to move along the irrigation dripper pipe.

7. The irrigation dripper deposit removing device of claim 1, wherein the electro-anti deposit device further includes:
   two vertical plates, wherein each vertical plate is placed on one side of the irrigation dripper pipe such that together the vertical plates squeeze the irrigation dripper pipe and hold the electro-anti deposit device tight thereto.

8. The irrigation dripper deposit removing device of claim 7, wherein the electro-anti deposit device further includes:
   a horizontal plate coupled to one of the two vertical plates, wherein the horizontal plate is configured to mount the engine via a fastening element.

9. The irrigation dripper deposit removing device of claim 8, wherein the fastening element includes nuts and bolts.

10. The irrigation dripper deposit removing device of claim 1, wherein the engine is configured to move the electro-anti deposit device until the water container is aligned with the irrigation dripper.

11. The irrigation dripper deposit removing device of claim 10, wherein the electro-anti deposit device further includes a controller configured to stop the movement of the electro-anti deposit device once the water container is aligned with the irrigation dripper.

12. The irrigation dripper deposit removing device of claim 11, wherein the controller is configured to automatically stop the movement of the electro-anti deposit device once the water container is aligned with the irrigation dripper.

13. The irrigation dripper deposit removing device of claim 11, wherein the controller is configured to stop the movement of the electro-anti deposit device once the water container is aligned with the irrigation dripper based on a manual input from a user.

* * * * *